(12) United States Patent
Murphy (10) Patent No.: US 10,949,927 B2
(45) Date of Patent: *Mar. 16, 2021

(54) INSURANCE DATA MANAGEMENT SYSTEM

(71) Applicant: Cloudbridge, LLC, Rye, NH (US)

(72) Inventor: Brian J. X. Murphy, Rye, NH (US)

(73) Assignee: Cloudbridge, LLC, Rye, NH (US)

( * ) Notice: Subject to any disclaimer, the term of this patent is extended or adjusted under 35 U.S.C. 154(b) by 73 days.

This patent is subject to a terminal disclaimer.

(21) Appl. No.: 16/517,896

(22) Filed: Jul. 22, 2019

(65) Prior Publication Data

US 2019/0340698 A1    Nov. 7, 2019

Related U.S. Application Data

(63) Continuation of application No. 14/870,331, filed on Sep. 30, 2015, now Pat. No. 10,453,148, which is a continuation of application No. 13/951,077, filed on Jul. 25, 2013, now abandoned.

(60) Provisional application No. 61/679,130, filed on Aug. 3, 2012.

(51) Int. Cl.
```
G06Q 40/00      (2012.01)
G06Q 40/08      (2012.01)
G06F 16/29      (2019.01)
G06F 16/242     (2019.01)
```
(52) U.S. Cl.
CPC ......... *G06Q 40/08* (2013.01); *G06F 16/2428* (2019.01); *G06F 16/29* (2019.01)

(58) Field of Classification Search
CPC .. G06Q 40/08; G06Q 10/087; G06Q 20/4014; G06Q 40/00
See application file for complete search history.

(56) References Cited

U.S. PATENT DOCUMENTS

| | | | | |
|---|---|---|---|---|
| 6,151,611 A * | 11/2000 | Siegel | ................... | G06F 17/243 |
| | | | | 382/187 |
| 7,266,558 B2 | 9/2007 | Gray | | |
| 2002/0029158 A1* | 3/2002 | Wolff | ..................... | G06Q 30/06 |
| | | | | 705/4 |
| 2011/0161116 A1* | 6/2011 | Peak | ...................... | G06Q 40/08 |
| | | | | 705/4 |
| 2011/0161117 A1* | 6/2011 | Busque | .................. | G06Q 40/08 |
| | | | | 705/4 |

* cited by examiner

*Primary Examiner* — Mike Anderson
(74) *Attorney, Agent, or Firm* — Andrus Intellectual Property Law (57) ABSTRACT

A system and method for the capture, storage and usage of specific insurance underwriting and/or loss validation data includes a handheld mobile computer device containing one or more master forms in which insurance data is entered into the handheld device, normally at the location of the insured home along with an electronic signature of the insured and a geocode and time/date stamp. The data is uploaded to a secure, structured database. Insurance data can also be entered, in a secure manner, via a customer portal by the insured or from third party data sources. The system includes software with the ability to pre-populate standardized underwriting forms based on the collected data. The system also manages electronic insurance quotes and bind orders as well.

15 Claims, 14 Drawing Sheets

Fig. 1

HOMEOWNER APPLICATION

| AGENCY | CARRIER | | DATE | |
|---|---|---|---|---|
| Castlebridge Risk Management, LLC<br>14 Lafayette Road, Suite #7<br>North Hampton, NH 03862 | NAMED INSURED(S):<br>James Smith<br>123 Johnson Street<br>Amherst, NH 03031 | | NAIC CODE | |
| CONTACT<br>NAME: James Smith<br>PHONE (A/C, NO, EXT):<br>FAX (A/C, NO):<br>E-MAIL ADDRESS: | POLICY NUMBER | | | |
| CODE: | PLAN | FACILITY CODE | EFFECT. DATE | EXPIR. DATE |
| AGENCY CUSTOMER ID: | | | | |

| STATUS OF TRANSACTION | | | | | |
|---|---|---|---|---|---|
| X | NEW | POLICY CHANGE | TIME | ☐ AM<br>☐ PM | DATE AGENT LAST INSPECTED PROPERTY |
| ☐ | RENEW | EFFECT. DATE | | | HOW LONG HAVE YOU KNOWN THE APPLICANT |
| ☐ | POLICY CHANGE | | | | |

FIG. 2

APPLICANT INFORMATION

| APPLICANT'S NAME (First, Middle, Last) | | APPLICANT'S MAILING ADDRESS |
|---|---|---|
| James Smith | | 123 Johnson Street |
| DATE OF BIRTH: April 20, 1978 | SSN: 123-45-6789 | MARITIAL STATUS*: Married | Amherst, NH 03031 |
| * This filed may not be utilized for policy holders applying for residential property insurance in CA | | PRIMARY E-MAIL ADDRESS |
| PRIMARY PHONE # | ☐ HOME ☐ BUS | ☐ CELL | SECONDARY PHONE # | ☐ HOME ☐ BUS | ☐ CELL | SECONDARY E-MAIL ADDRESS |
| PREVIOUS ADDRESS | YRS AT PREVIOUS ADDRESS | CURRENT RESIDENCE  x   Check if same as mailing address ☐ OWNED  ☐ RENTED |
| | | DATE AT CURRENT RESIDENCE: 5 years |
| APPLICANT'S EMPLOYER NAME AND ADDRESS | | OCCUPATION (Nature of Business if Self-Employed) |
| YRS WITH EMPLOYER | | YRS IN CURRENT OCCUPATION | YEARS WITH PREVIOUS EMPLOYER |

FIG. 2 (Cont)

| CO-APPLICANT'S NAME (First, middle, last) | | | CO-APPLICANT'S ADDRESS | ☐ Check if same as Applicant |
|---|---|---|---|---|
| DATE OF BIRTH | SSN | MARITIAL STATUS* | | |
| * This filed may not be utilized for policy holders applying for residential property insurance in CA | | | PRIMARY E-MAIL ADDRESS | |
| PRIMARY PHONE # | ☐ HOME ☐ BUS | SECONDARY PHONE # ☐ HOME ☐ CELL ☐ BUS | SECONDARY E-MAIL ADDRESS | |
| CO-APPLICANT'S EMPLOYER NAME AND ADDRESS | | | OCCUPATION (Nature of Business if Self-Employed) | |
| YRS WITH EMPLOYER | | | YRS IN CURRENT OCCUPATION | YEARS WITH PREVIOUS EMPLOYER |

FIG. 2 (Cont)

COVERAGES / LIMITS OF LIABILITY LOC#:

| COVERAGE | LIMIT | PREMIUM | COVERAGE | OPTION | LIMIT | PREMIUM |
|---|---|---|---|---|---|---|
| DWELLING | $ | $ | REPL COST - FULL VALUE | INCL. | % MAX | $ |
| OTHER STRUCTURES | $ | $ | REPL COST - DWELLING | INCL. | | $ |
| PERSONAL PROPERTY | $ | $ | REPL COST - CONTENTS | INCL. | | $ |
| LOSS OF USE | $ | $ | | | | |
| BLANKET* | $ | $ | DEDUCTIBLE | AMOUNT | PERCENT | TYPE |
| PERSONAL LIABILITY EA OCC | $ | $ | BASE | $ | % | |
| MEDICAL PAYMENTS EA PER | $ | $ | WIND/HAIL | $ | % | |
| | | | THEFT | $ | % | |
| HO FORM # | | | | $ | % | |

| | | DEDUCTIBLE | AMNT | PER. | TYPE |
|---|---|---|---|---|---|
| | | NAMED HURRICANE* | $ | % | |
| | | ANNUAL HURRICANE** | $ | % | |
| | | | $ | % | |
| | | | | % | |

* Includes Dwelling, Other Structures, Personal Property, Loss of Use
* Named Storm Percentage Deductible in North Carolina
** Not Applicable in North Carolina FORMS AND ENDORSEMENTS (Attached Forms and Endorsements Schedule, if more space is required)

| LOC NO. | VEH NO. | BOAT NO. | ITEM NO. | FORM No. | FORM NAME | ED. DATE | COPYRIGHT OWNER CODE |
|---|---|---|---|---|---|---|---|
| | | | | | | | |

RDMS Collect

Home

General Information Residential

Any business conducted on premises?

Home office/business; Telecommuter

Note:

Any residence employees?

None

Note:

Any Natural Hazards?

Any Natural Hazards?

Flooding ✓

Brush Fire ☐

Forest Fire ☐

Landslide ☐

None ☐

| Ok | Cancel |

Is the dwelling / home for sale?

Note:

Is property within 300 feet of a commercial or nonresidential property?

Note:

Is there a trampoline on the premises?

Save     Send

Fig. 3C

RDMS Collect

Home

General Information Residential

Any other insurance with this company? (List policy numbers)

No

Note:

Has any coverage been declined, cancelled or non-renewed during the last three years?

No

Note:

Has applicant had a foreclosure, repossession, bankruptcy of filed for bankruptcy during the Note:

During the last five years[ten years in Rhode Island], has any applicant been indicted for or convicted of any degree of the crime of fraud, bribery, arson, or any other arson related crime in connect Yes No Has insurance been transferred within agency?

Note:

Does applicant own any recreational vehicles not scheduled on this policy?

Note:

During the last five years[ten years in Rhode Island], has any applicant been indicted for or convicted of any degree of the crime of fraud, bribery, arson, Note:

Save    Send

RDMS Collect

Auto

All Questions

Name

John Smith

Note:

Date of Birth

Apr 20, 2012

Note:

Social Security

000111222

Note:

Marital Status

Married

Note:

Primary Phone

6035556666

Save    Send

Fig. 4A

RDMS Collect

Auto

‹ Vehicle Description / Use ›

Note: ?

Loc

| 1 › |

Note: ?

Year

| 1999 › |

Note: ?

Make

| Ford › |

Note: ?

Model

| Focus › |

Note: ?

Save | Send | ^

Fig. 4B

RDMS Collect

Auto

Garaging Address

Street

123 Smith Street

Note:

City

Amerst

Note:

County

Hillsborough

Note:

State

NH

Note:

Zip Code

03031

Save    Send

Fig. 4C

RDMS Collect

Auto

General Info

Note:

Any other auto insurance in household? (Include any provided by employer)

No

Note:

Any household member in military service?

No

Note:

Any drivers license been suspended / revoked?

No

Note:

Any driver have a physical impairment?

Note:

Save    Send

Fig. 4D

INSURANCE DATA MANAGEMENT SYSTEM

CROSS REFERENCE TO RELATED APPLICATIONS

The present application is a continuation of pending U.S. application Ser. No. 14/870,331 filed Sep. 30, 2015; which application is a continuation of U.S. application Ser. No. 13/951,077 filed Jul. 25, 2013, now abandoned; which application claims priority to U.S. Provisional Application 61/679,130 filed Aug. 3, 2012.

FIELD OF THE INVENTION

The invention pertains to a system and method for the capture, storage and utilization of specific data of value in the property and casualty insurance markets.

SUMMARY OF THE INVENTION

The invention pertains to insurance portfolio data management. More specifically, a system operating in accordance with invention enables insurance agents to collect, collaborate and analyze real-time structured data received from the field through a handheld mobile device, through a customer website portal or software app, or from third party data sources. The data can be accessed by insurance customers, underwriters and/or agents, and comprehensive electronic forms and reports are generated. For example, standardized underwriting forms, such as the Accord® form or other format desired by a particular underwriter are generated by the information stored in the insurance portfolio data management system. Underwriters provide trackable insurance quotes in electronic form to the insurance portfolio data management system which in turn generates a quote report that is sent in electronic form to licensed insurance agents. The licensed insurance agents complete the transaction and bind coverage for the insured, and then transmit a trackable bind order to the insurance portfolio data management system which in turn generates a trackable bind order that is sent to the respective underwriter.

One of the primary features of the invention is to collect data in the field via a handheld mobile computing device which includes global positioning technology, such as a computer tablet with the appropriate software, or other handheld GPS enabled mobile input device. An employee for an insurance company (or the system administrator) can enter data in a master form on the handheld device which desirably associates a geocode and a time/date stamp with the information. The onsite data collection also optionally includes the ability to add photographs, video, scanned documents or voice messages as part of the geocoded and time/date stamped record. The handheld mobile computing device also desirably includes a stylus and an electronic signature capability, and provides the binding of contracts through the electronic signature capability. The stylus can also be used to superimpose handwritten notes over a static photo or scanned document. It is also desirable that the handheld mobile computing device have the ability to scan barcodes. The barcode scanning feature is a particularly effective and efficient way to enter vehicle identification information, and other information that make be encoded by bar code.

The insurance portfolio data management system can be used in a variety of applications, but two preferred applications are noted. The first preferred application is to use the mobile tool in the field in order to gather fundamental data for insurance procurement. Since fundamental data collection occurs in the field, the system improves convenience to the customer and accuracy of the collected information. The second preferred application is to use the mobile tool when responding to a claim of an insured loss. Again, the mobile device can be used to reliably and efficiently collect onsite information regarding the validation of a loss. The claims adjuster will then be better able to make a more informed decision regarding coverage determinations.

In addition, the data collected can be integrated into existing databases and management systems. The system can thus be used as a stand-alone system or as a supplement to an existing system. Commercial users of the system can be clustered in a hierarchy that relates to their commercial structure. The hierarchy allows managers and supervisors to review the dashboard metrics of their direct reports, and can be customized for each commercial subscriber.

Other features and objects of the invention will be apparent to those skilled in the art upon reviewing the following drawings and description thereof.

DETAILED DESCRIPTION

Figure 1:
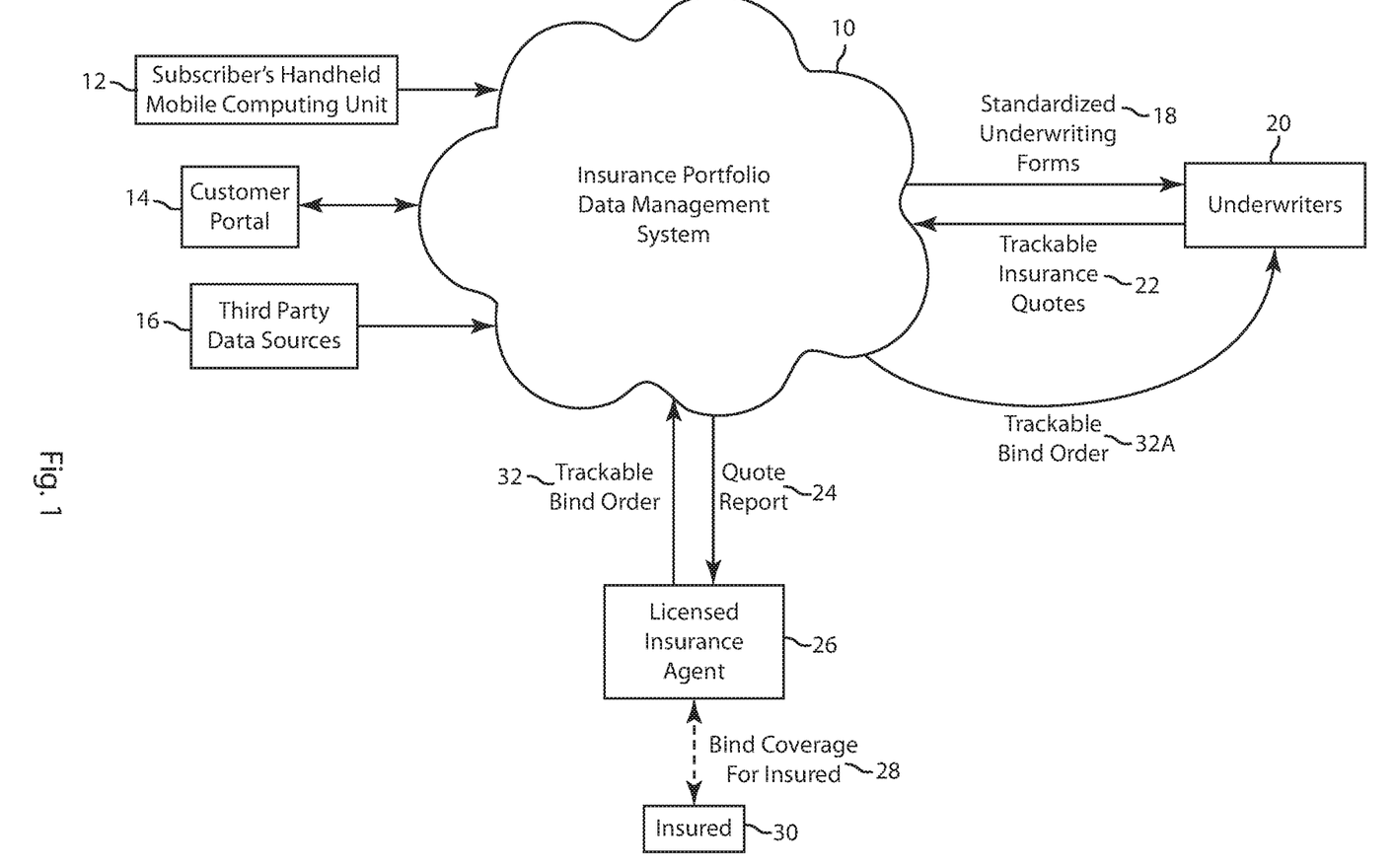
FIG. 1 is a block diagram illustrating of an exemplary use of the invention.

Referring to FIG. 1, an insurance portfolio data management system 10 operating in accordance with the invention preferably receives uploaded insurance data from several sources, and organizes the data in one or more structured databases. The insurance portfolio data management system 10 also interacts electronically with insurance underwriters 20 and licensed insurance agents 26. The administrator or subscriber of the insurance portfolio data management system 10 engages an insurance consumer 30 prior to entering data into the system 10. Data collection can occur in a number of ways. Block 12 labeled subscriber's handheld mobile computing unit is a handheld mobile computing device that collects data which is uploaded to the insurance portfolio data management system 10, as indicated by the one-way arrow between the mobile unit 12 and system 10 in FIG. 1. The system 10 contains one or more structured databases that can be separated in order to segregate data collected for various subscribers. Typical subscribers would be an insurance agent or a claims adjustor service or a third party representative. On the other hand, the system 10 can be implemented as a single database for a single system administrator such as an insurance agency or a claims adjustor, etc. . . .

The handheld mobile computing device 12 can be a laptop, tablet or smartphone including global positioning technology with appropriate software, or can be another type of handheld GPS enabled mobile computing device. The preferred device 12 is a tablet having a stylus. As mentioned above, an employee for the insurance company, or the administrator or some other individual, enters data into one or more master forms on the handheld device 12, which also preferably associates a geocode and a time and date stamp with the information. It is also preferred that the handheld mobile computing device 12 have the ability to take photographs and video, and record voice messages as part of the record and also geocode and time and date stamp the photographs, video and voice messages as well. Further, it is desirable that the handheld mobile computing device 12 include electronic signature capability to allow the binding of contracts on site with the stylus. Further, it may be desirable to include a document scanner that can communicate with the handheld mobile computing device 12 on site. The stylus can be used to make electronic notes on geocoded/time and date stamped photographs or scanned documents. In addition, as mentioned above, it is desirable the handheld computing device include a bar code scanning feature. The technical implementation of collecting the data in the field and uploading the geocoded and time/date stamped data to the insurance portfolio data management system 10 is preferably similar to the technical implementation described in U.S. Pat. No. 7,267,558, entitled "Method and Apparatus for Global Relief Management", which issued on Sep. 4, 2007 and is hereby incorporated by reference. The mobile handheld computing device would normally include cellular and WiFi communication to upload the data.

Figure 3A:
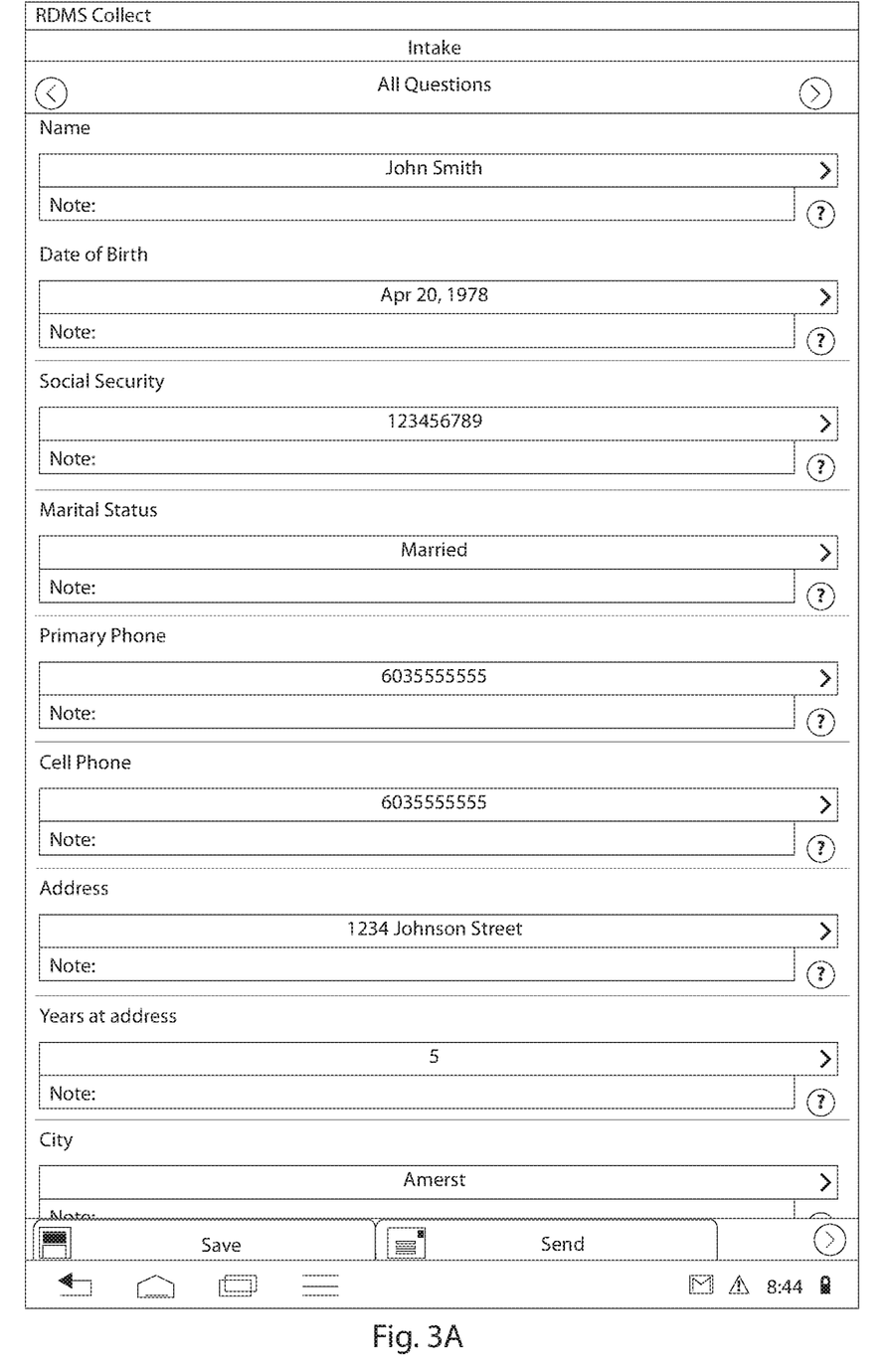
FIGS. 3A-3E are exemplary screenshots for the handheld mobile unit for onsite collection of insurance information pertaining to customer intake and home owner's insurance.
Figure 3B:
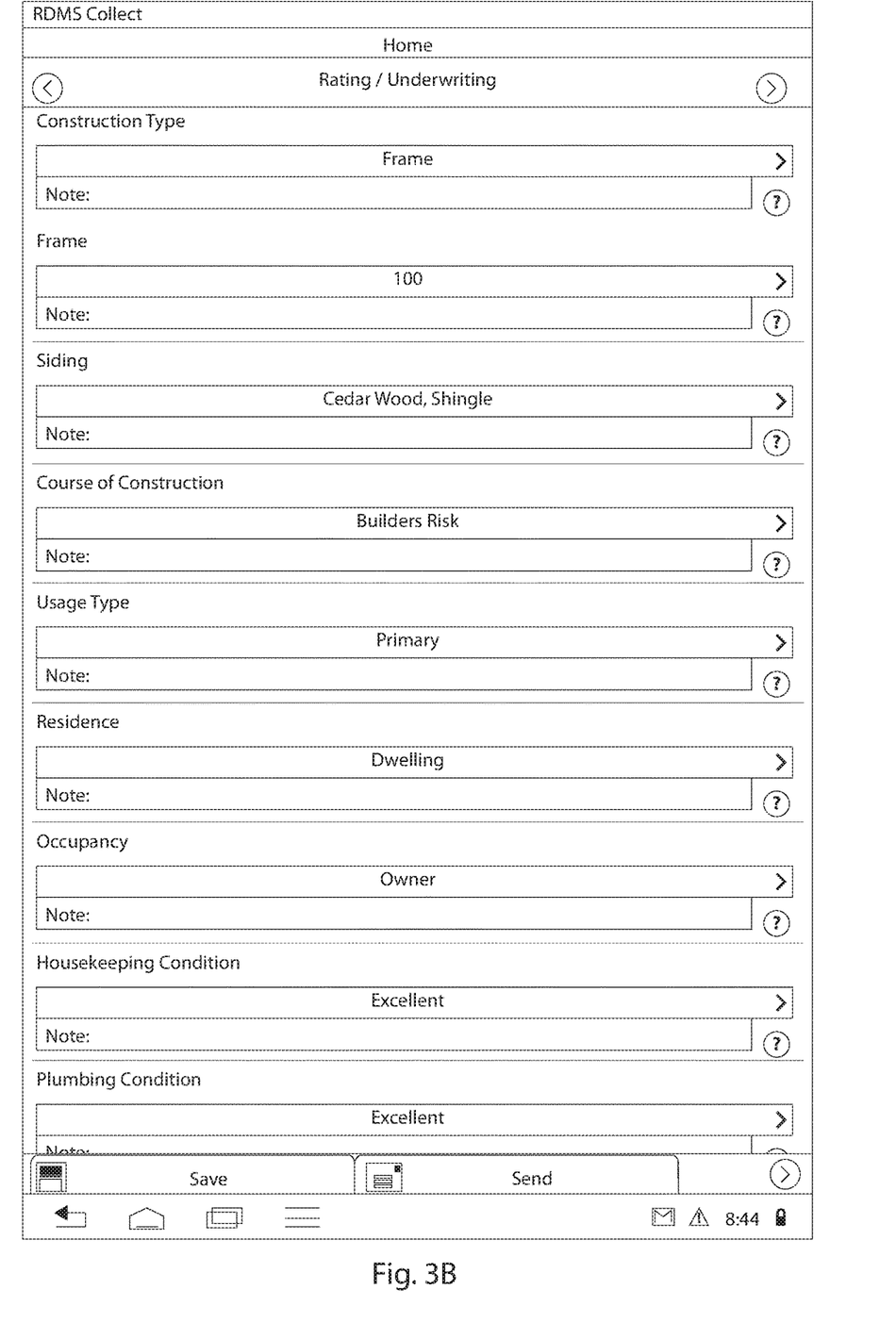
Figure 3C:
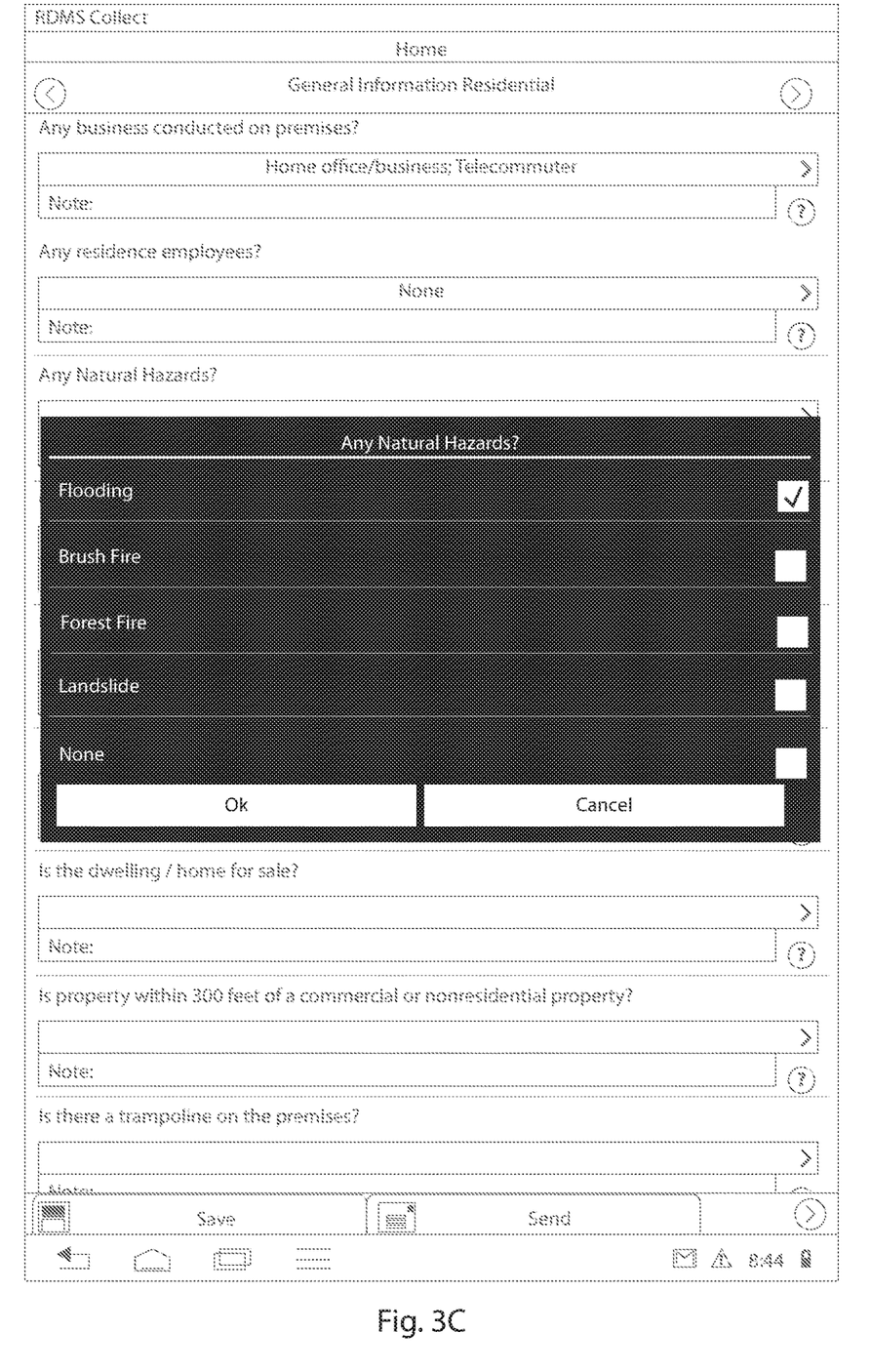
Figure 3D:
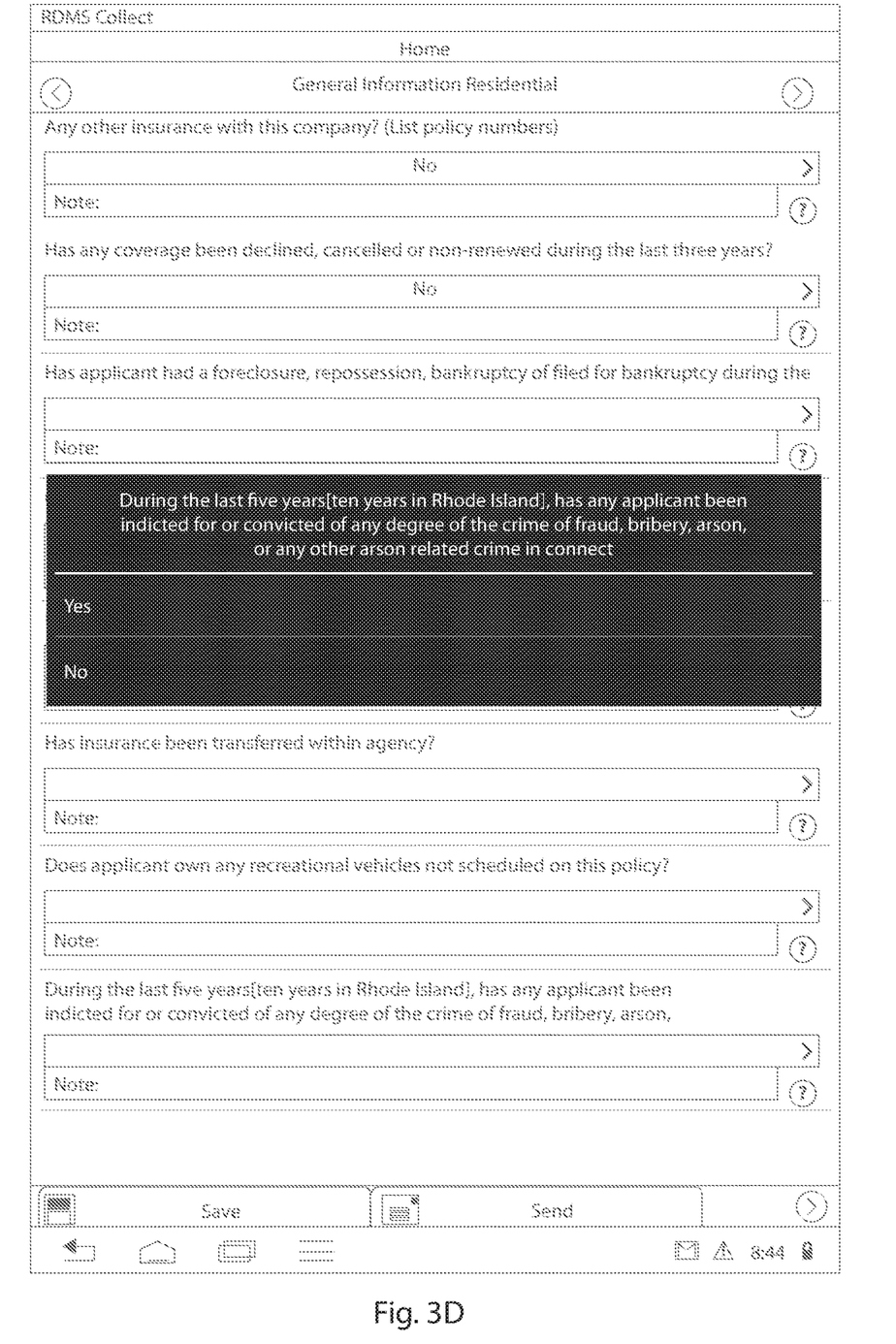
Figure 3E:
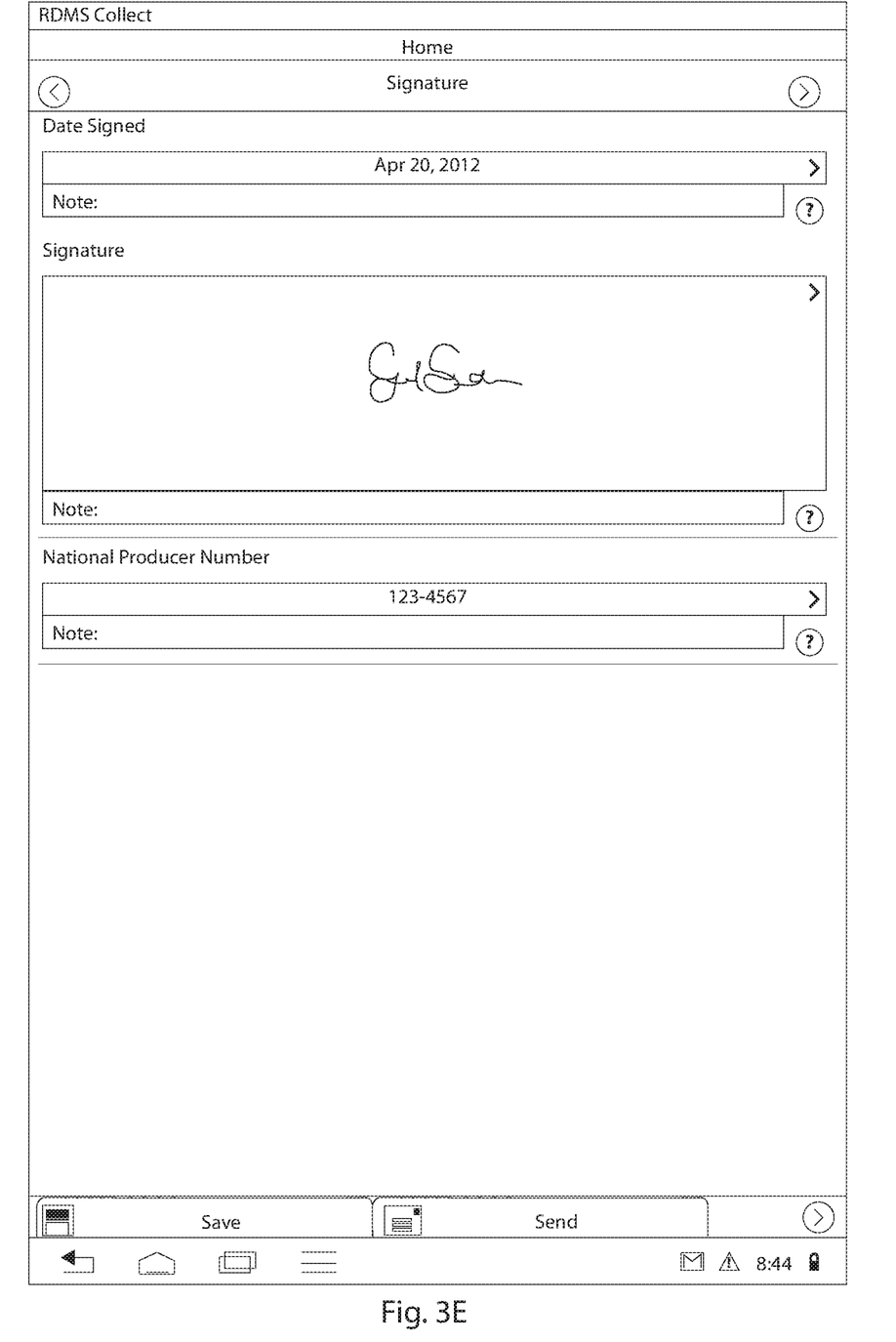
Figure 4A:
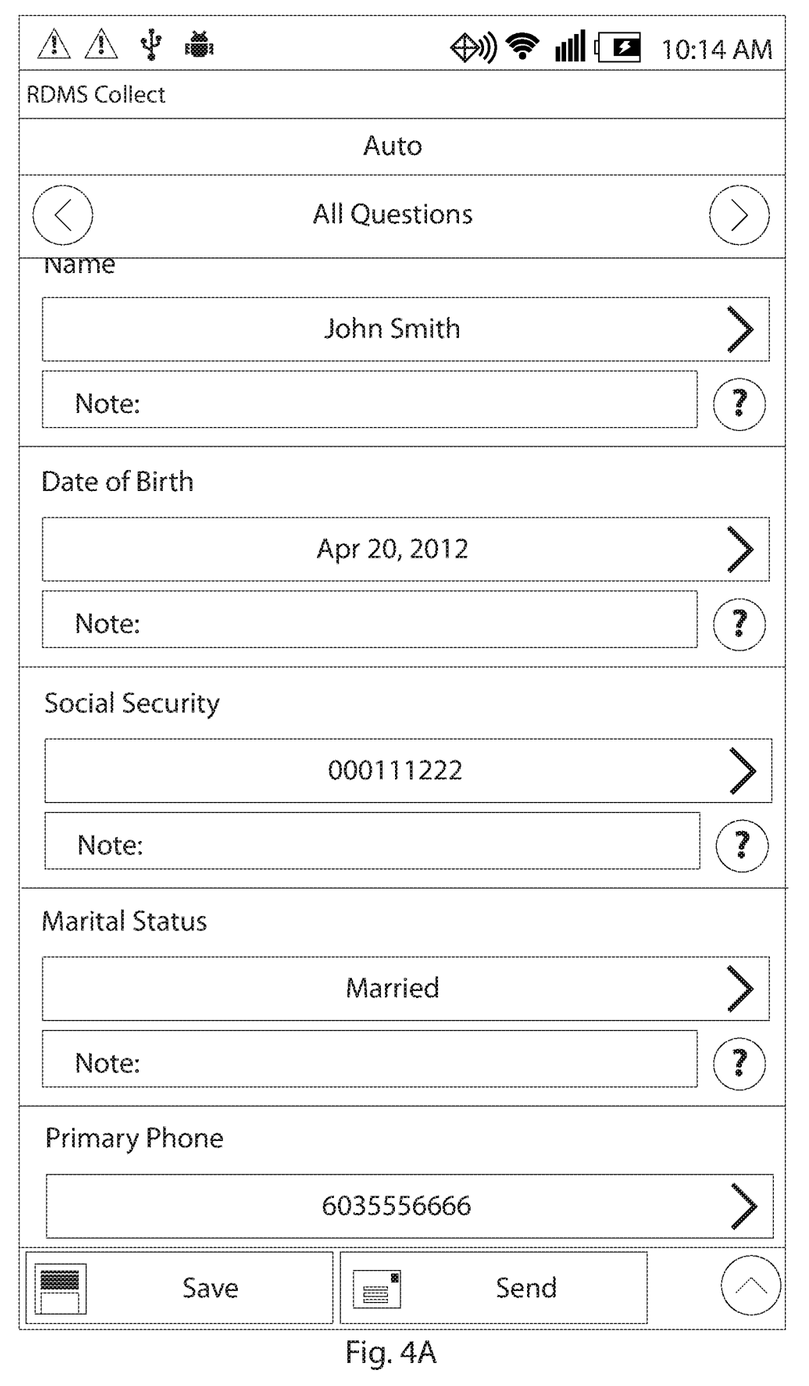
FIGS. 4A-4D are exemplary screenshots on the handheld mobile unit pertaining to the onsite collection of data pertaining to auto insurance.
Figure 4B:
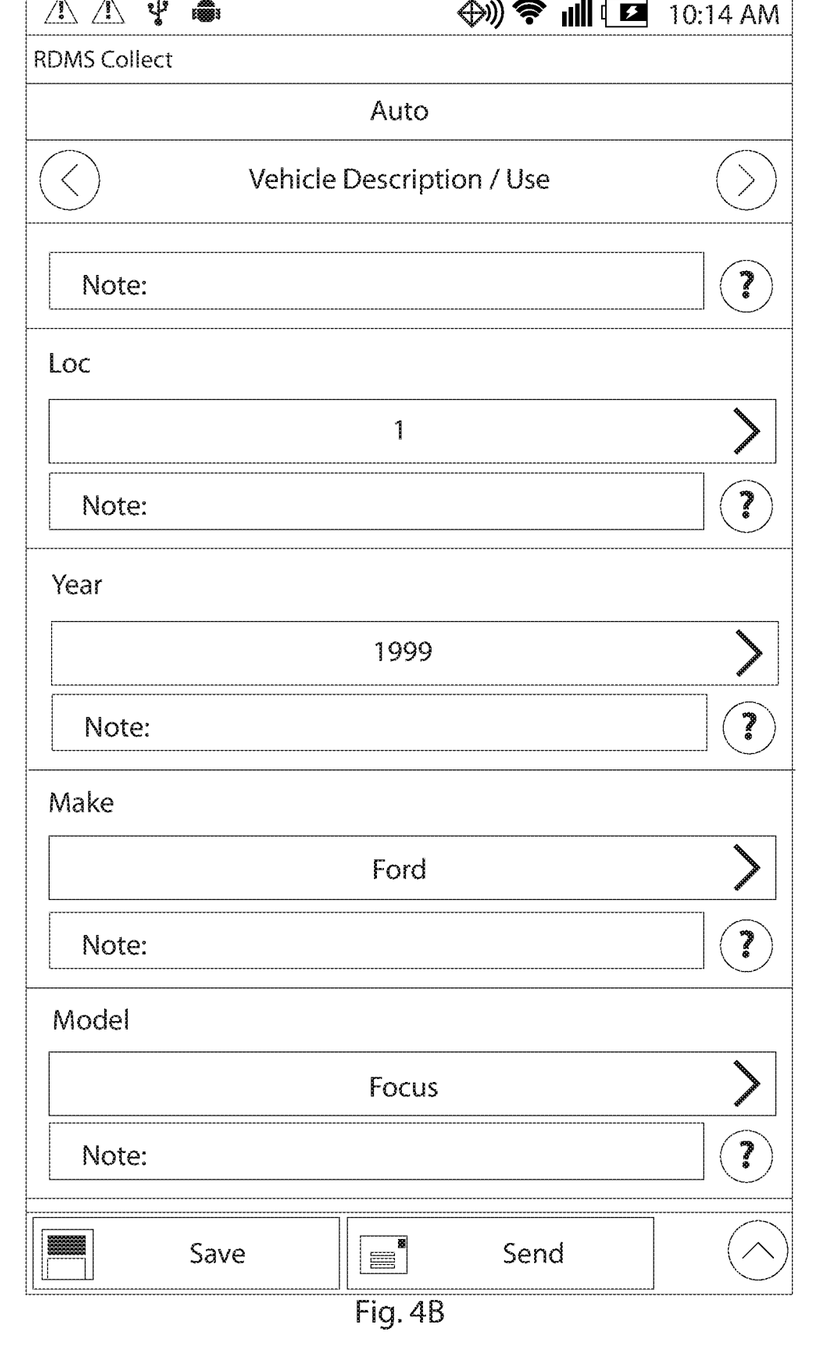
Figure 4C:
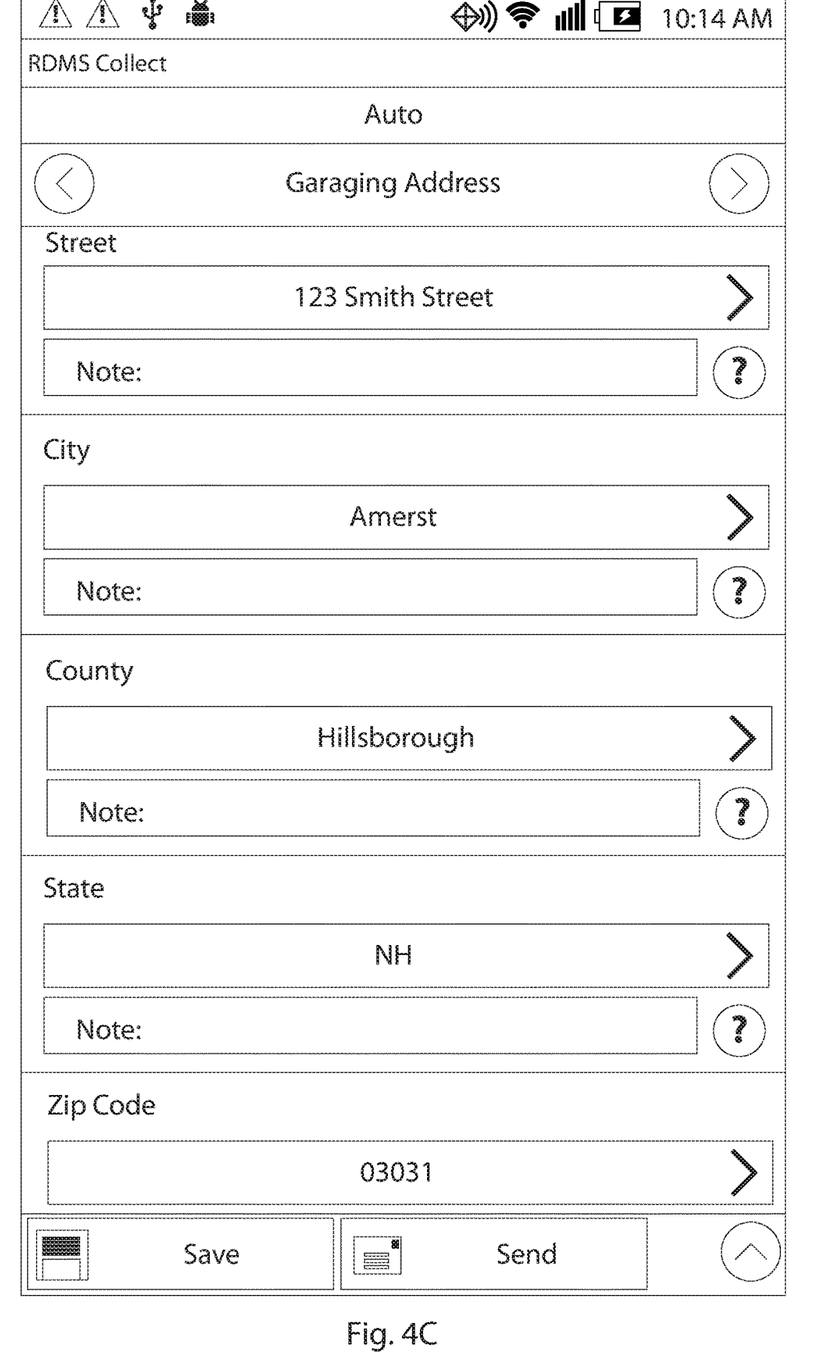
Figure 4D:
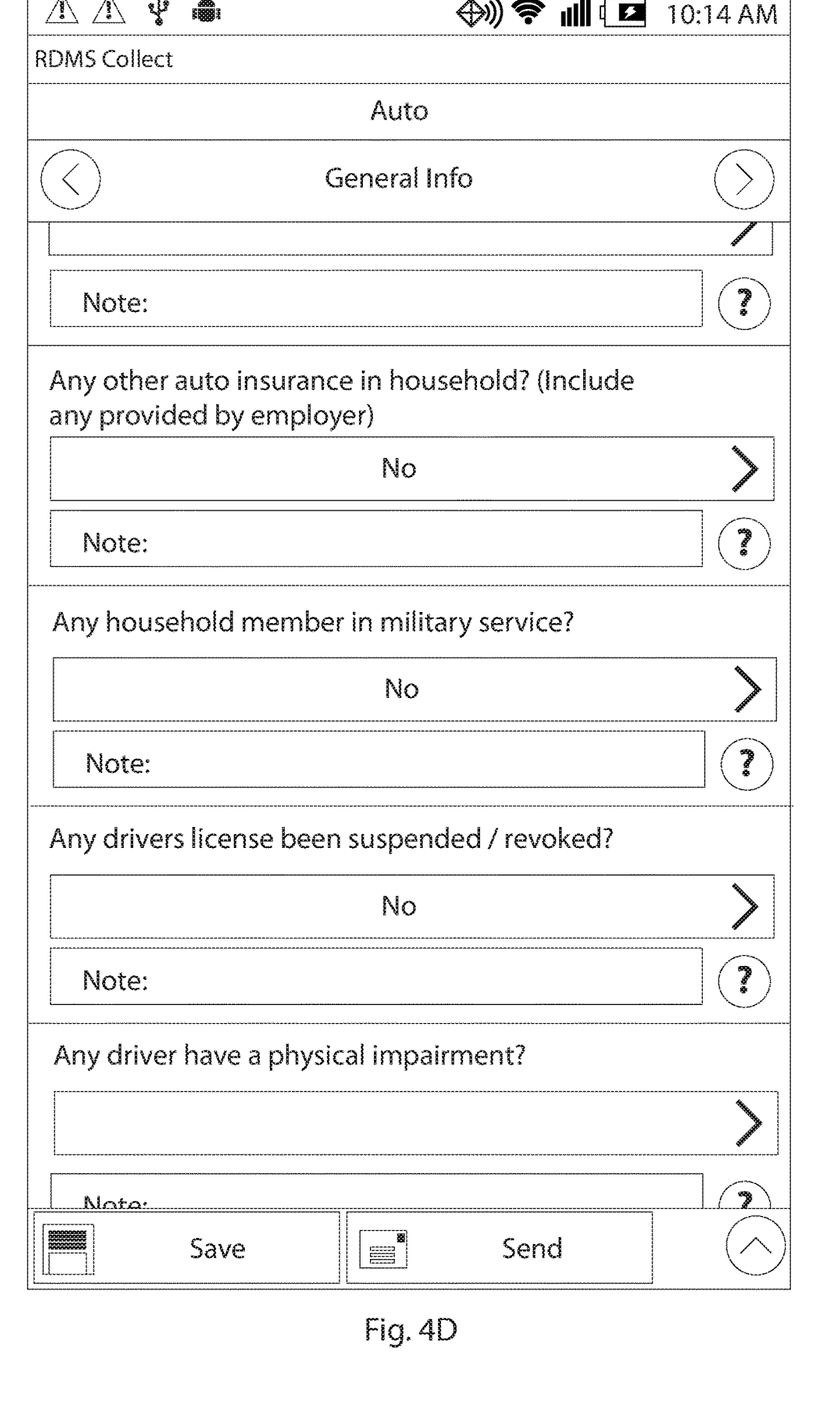

FIGS. 3A-3E are representative data input screens for the handheld mobile computing device 12 for the onsite collection of insurance data pertaining to home owner's insurance. FIG. 3A is a representative customer "intake" page and includes a number of fields pertaining to the identity of the homeowner and the location of the home. FIG. 3B is the first screen on the "home" page and includes fields pertaining to home construction parameters and the usage of the property. FIG. 3C is a second screen of the "home" page including fields pertaining to general information regarding the residence such as whether business is conducted on premise, if there are any employees at the residence, etc. FIG. 3C also prompts the user to indicate whether any natural hazards are present and illustrates a pop-up menu displayed on the screen prompting specifically whether flooding, brush fire, forest fire, landslide or none of these hazards are present. The screen also shows other fields that are typically pertinent such as whether the dwelling is for sale, whether the home is within 300 feet of a non-residential property, or whether there is a trampoline on premise. FIG. 3D illustrates another screen on the "home" page having fields prompting for additional information such as other insurance with this company, whether coverage has been declined or canceled in the past three years, whether the applicant has been subject to foreclosure, repossession or bankruptcy in the last five years, indicted or convicted for a crime, whether insurance has been transferred within the agency, or whether applicant owns any recreational vehicles. Note that the instructions for filling out the fields can be quite specific with respect to various state laws. FIG. 3E is an example of the signature screen for the "home" page illustrating the electronic signature capability of the system. The electronic signature capability allows the home owner to easily verify that the information that is collected onsite is accurate as of the date of data collection. FIGS. 4A-4D show an alternative set of screens including fields and questions pertinent to auto insurance. The software can also include a help function if desired. One of the most advantageous aspects of the invention is the ability to collect accurate, verifiable data onsite in the presence of the home owner using the handheld computing device 12. The use of the handheld mobile computing device 12 onsite during data collection should increase sales efficiency because it brings the sales cycle to the consumer.

If a claims adjuster were to subscribe and use the system, the adjuster could access policy data on the system pertaining to the insurance customer with the alleged loss, and would also use the handheld mobile computing device 12 to collect onsite data verify the loss.

Referring again to FIG. 1, data can also be uploaded to the insurance portfolio data management system 10 via a secure (password protected) customer portal 14, preferably in the form of a web site or a customer app for a smart phone or tablet. The double-sided arrow between the customer portal 14 and the insurance portfolio data management system 10 in FIG. 1 indicates that data can be uploaded from the customer portal 14 to the system 10, and conversely can be downloaded from the system 10 to the customer. The customer portal 14 would normally be used by a customer in order to enter or supplement data into prompted fields, but is also desirable to allow the insurance consumer 30 to review data pertinent to their property or automobiles that is stored in the one or more structured databases within the insurance portfolio data management system 10. For example, the insured may wish to download photographs, video or documents pertaining to their property or insurance. The data collection center within the insurance portfolio data management system 10 is secured and protected. For example, it is highly preferred that the customer portal have a secured website and consumer app, and that data submitted by the insurance consumer through the customer portal 14 be securely transmitted to the collection center which itself is secured and protected.

Data can also be uploaded to the insurance portfolio data management system 10 from third party data sources as illustrated by block 16 in FIG. 1. Example of third party data sources include credit scores from Dunn & Bradstreet, automobile history from CarFax, tax assessment values, or ISD data which includes other insurance related information.

Figure 2:
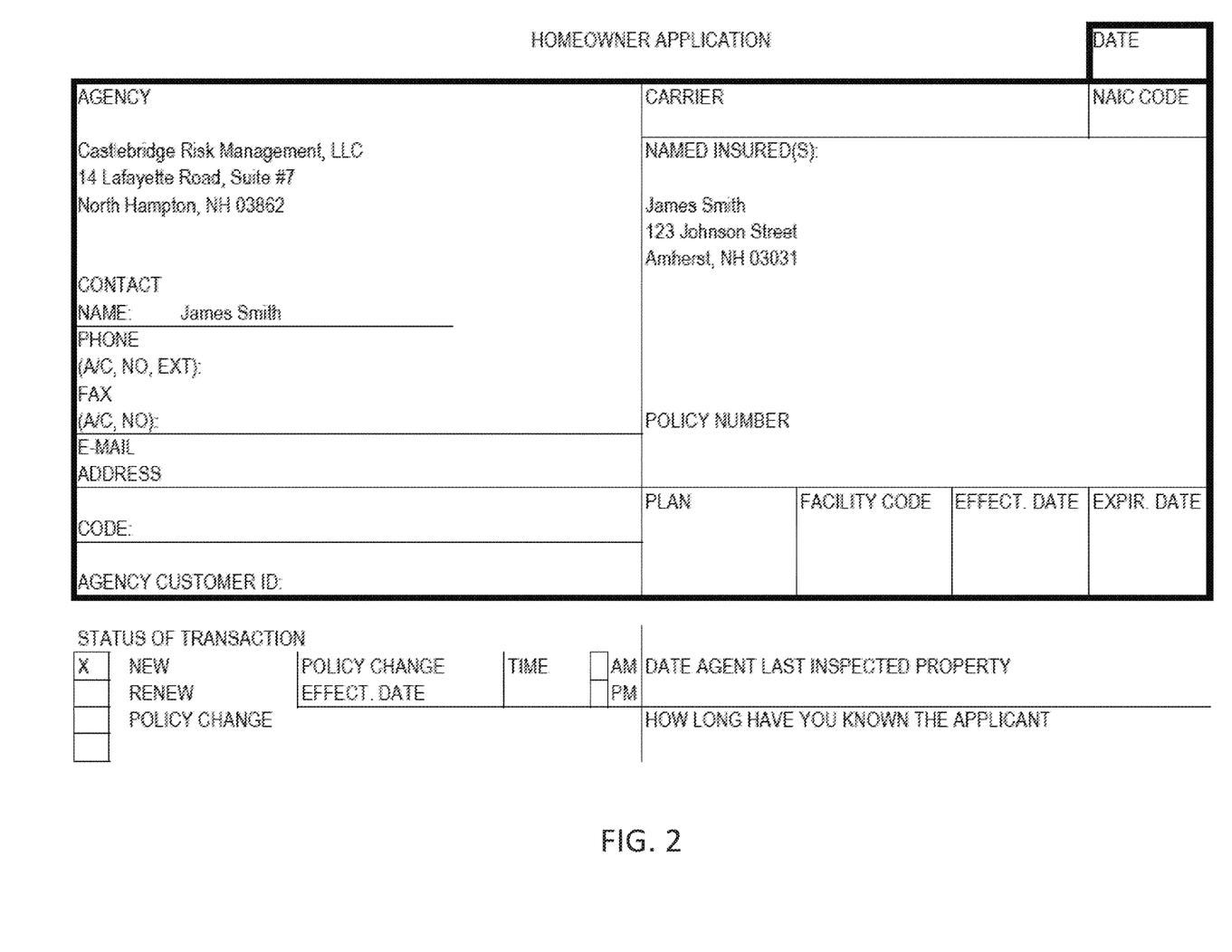
FIG. 2 is an example of well-known standardized insurance underwriting form, branded as the Accord® form.

Once the necessary data is collected, either from the master forms on the handheld computing device 12 (e.g. FIGS. 3A-3E and 4A-4D), the customer portal 14 or from third party sources 16, the insurance portfolio data management system 10 organizes the data in the structured database, and then pre-populates one or more standardized underwriting forms 18 which are electronically sent to various underwriters 20. These pre-populated forms 18 contain critical underwriting data. FIG. 2 is an example of a standardized underwriting form, page 1 of 6, bearing the Accord® trademark. The Accord® form is widely used throughout the insurance industry and the insurance portfolio data management system 10 preferably has the ability to pre-populate such forms. It is desired, however that the system 10 also be able to populate a variety of other standardized underwriting forms inasmuch as the various underwriters may have different requirements. The system 10 may be configured with the ability to automatically send the electronic, pre-populated underwriting forms 18 to the respective underwriters 20, or alternatively the pre-populated underwriting forms may be stored on a computer system and sent by email to the various underwriters.

In addition to the standardized underwriting forms 18, the system is capable of providing supplemental underwriting data, e.g. photographs collected by the handheld mobile computing device 12. In this way, data collected from the handheld unit 12 or the customer portal 14 or the third party data sources 16 that is more comprehensive than the data on the typical standardized underwriting forms is efficiently provided to the underwriters.

Each underwriter 20 provides a trackable insurance quote 22 that is unique to the individual consumer risk profile (as compiled through the process). The administrator of the insurance portfolio data management system 10 (e.g., normally a certified licensed insurance agent 26 subscribing to the system 10) then integrates the quotes 22 into a standard electronic format (a quote report 24), and provides an analysis and recommendation to the insurance consumer 30 regarding coverage. The licensed insurance agent 26 binds coverage for the insured 30, see reference numbers 28-30. Upon review and approval by the insured 30, arrangements to bind coverage 28 are completed by the insured 30 and the certified agent 26, and a trackable bind order 32 is electronically transmitted to the insurance portfolio data management system 10. The trackable bind order 32A is also electronically transmitted from the system 10 to the respective underwriter 20, see reference number 32A in FIG. 1 to complete the process.

The administrator of the system 10, with the permission of the insured 30, retains the underlying data and it is available to the insured 30 via the secured web based portal 14. The consumer/insured 30 is able to review, update and supplement their data electronically via the customer portal 14 as time passes. The subscribers of the system 10 are also able to access the data integrated into existing databases pertaining to their business. Managers and supervisors can review this data and dashboard metrics customized for their business.

The insurance agent (or insurance broker) is able, if desired, to automatically reinitiate the process of marketing insurance to the customers in the database on a periodic basis, such as every three years, generally in the same manner as discussed above. Consumers/insured 30 can opt in to electronic communications from the administrator regarding weather advisories, risk management protocols, and product/service offerings that may reduce their risk profile, mitigate any future loss, and positively impact their annual premiums. The system 10 should also improve operational efficiency and simplify the work process in other ways as well, such as reducing overhead.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method comprising the steps of:
a) providing an insurance portfolio data management system comprising a structured database containing property and casualty insurance data for insurance customers, the insurance portfolio data management system configured to electronically communicate with a handheld mobile computing device, a third party data source, and a multiplicity of underwriter computers, each of the multiplicity of underwriter computers having a particular standardized underwriting data requirement;
b) providing said handheld mobile computing device comprising a display providing a user interface, a global positioning device that creates geocodes and time and date stamps corresponding to a location of the handheld mobile computing device and one or more master forms displayable on the display of the handheld mobile computing device for entering property and casualty insurance underwriting data in a variety of prompted fields, said master forms prompting the entry of data comprehensive of particular standardized data requirements for multiple underwriters;
c) using identification indicia of a licensed insurance agent to verify that the licensed insurance agent or assistant is present with the handheld mobile device;
d) downloading third party data from at least one third party data source;
e) entering data through the user interface into unfilled prompted fields on the one or more master forms on the display of said handheld mobile computing device;
f) associating a geocode and time and date stamp created by said global positioning device of the handheld mobile computing device with the data entered through the user interface into prompted fields on the one or more master forms on the display of said handheld mobile computing device to create a geocoded and time and date stamped record of underwriting data including the data entered through the user interface which is geocoded and time stamped and the downloaded third party data;
g) associating said identification indicia of said licensed insurance agent entered into said handheld mobile computing device with the geocoded and time and date stamped record of underwriting data;
h) after step g), uploading the geocoded and time and date stamped record of underwriting data for the respective customer with the identification of the licensed insurance agent associated therewith to the insurance portfolio data management system;
i) automatically creating with the insurance portfolio data management system one or more underwriter specific standardized files, each underwriter specific standardized file having a particularized format satisfying said particular standardized data requirements for the respective underwriter computer, from some or all of the geocoded and time and date stamped record of underwriting data, with the identification of the licensed insurance agent associated therewith;
j) electronically transmitting from the insurance portfolio data management system at least one of the underwriter specific standardized files to at least one of the multiplicity of underwriter computers having the same particular standardized underwriting data requirement as the electronically transmitted underwriter specific standardized file;
k) determining via electronic interactions between the insurance portfolio data management system, the handheld mobile computing device and at least one underwriter computer, whether to provide supplemental underwriting data to the respective underwriter computer in addition to the respective transmitted underwriter specific standardized file;
l) if it is determined to provide supplemental underwriting data to the respective underwriter computer, entering supplemental underwriting data through the interface of the handheld mobile computing device to supplement the geocoded and time and date stamped record of underwriting data for the respective customer, associating a geocode and time and date stamp created by said global positioning device of the handheld mobile computing device with the entered supplemental underwriting data; uploading from said handheld mobile computing device the geocoded and time and date stamped supplemental underwriting data to the insurance portfolio data management system as part of the respective record of underwriting data; and providing from the insurance portfolio data management system the geocoded and time and date stamped supplemental underwriting data to the respective underwriter computer; and m) receiving electronically at least one quote on the handheld mobile computing device that is unique to an individual consumer risk profile for the respective customer.

2. The method in claim 1 further comprising, after step m), the steps of:

n) electronically binding coverage on the handheld mobile computing device in accordance with one of the at least one quotes; and o) electronically transmitting the bind order form the handheld mobile computing device to the structured database and the respective underwriter computer.

3. The method in claim 2 wherein electronic binding is accomplished via an electronic signature through the display of the handheld mobile computing device.

4. The method in claim 1 further comprising the step of entering an electronic customer verification through the display of the handheld mobile computing device after steps d) and e) to verify the downloaded data from said third party data source and data entered through the user interface into prompted fields on the one or more master forms on the display of said handheld mobile computing device.

5. The method in claim 1 further comprising the step of displaying on the handheld mobile device the downloaded data from said third party data source and data entered through the user interface into prompted fields on the one or more master forms.

6. The method in claim 4 wherein customer verification is implemented by electronic signature are entered into the handheld mobile computing device.

7. The method in claim 1 wherein the underwriting data includes a photograph taken with the handheld mobile computing device.

8. The method in claim 1 wherein the supplemental underwriting data includes a photograph taken with the handheld mobile computing device.

9. The method in claim 1 wherein at least some of underwriting data is entered using a video recorder, a bar code reader or document scanner on or connected to the handheld mobile computing device.

10. The method in claim 1 wherein at least some of supplemental underwriting data is entered using a video recorder, a bar code reader or document scanner on or connected to the handheld mobile computing device.

11. The method in claim 1 wherein multiple underwriter specific standardized files are electronically transmitted to multiple respective underwriter computers.

12. The method in claim 1, the underwriting data includes a voice message recorded with the handheld mobile computing device.

13. The method in claim 1, the supplemental underwriting data includes a voice message recorded with the handheld mobile computing device.

14. The method in claim 1, wherein a stylus is used to superimpose handwritten notes on a photograph or scanned document which is included the underwriting data or supplemental underwriting data for the respective customer.

15. A method comprising the steps of:

a) providing an insurance portfolio data management system comprising a structured database containing property and casualty insurance data for insurance customers, the insurance portfolio data management system configured to electronically communicate with a handheld mobile computing device, a third party data source, and at least one underwriter computer, the at least one underwriter computer having a particular standardized underwriting data requirement;

b) providing said handheld mobile computing device comprising a display providing a user interface, a global positioning device that creates geocodes and time and date stamps corresponding to a location of the handheld mobile computing device and one or more master forms displayable on the display of the handheld mobile computing device for entering property and casualty insurance underwriting data in a variety of prompted fields, said master forms prompting the entry of data comprehensive of the particular standardized data requirements for the at least one underwriter;

c) using identification indicia of a licensed insurance agent to verify that the licensed insurance agent or assistant is present with the handheld mobile device;

d) downloading third party data from at least one third party data source;

e) entering data through the user interface into unfilled prompted fields on the one or more master forms on the display of said handheld mobile computing device;

f) associating a geocode and time and date stamp created by said global positioning device of the handheld mobile computing device with the data entered through the user interface into prompted fields on the one or more master forms on the display of said handheld mobile computing device to create a geocoded and time and date stamped record of underwriting data including the data entered through the user interface which is geocoded and time stamped and the downloaded third party data;

g) associating said identification indicia of said licensed insurance agent entered into said handheld mobile computing device with the geocoded and time and date stamped record of underwriting data;

h) after step g), uploading the geocoded and time and date stamped record of underwriting data for the respective customer with the identification of the licensed insurance agent associated therewith to the insurance portfolio data management system;

i) automatically creating with the insurance portfolio data management system at least one underwriter specific standardized file from some or all of the geocoded and time and date stamped record of underwriting data, with the identification of the licensed insurance agent associated therewith, wherein each underwriter specific standardized file has a particularized format satisfying said particular standardized data requirements for the respective underwriter computer;

j) electronically transmitting from the insurance portfolio data management system at least one underwriter specific standardized file to the at least one underwriter computers;

k) determining via electronic interactions between the insurance portfolio data management system, the handheld mobile computing device and at least one underwriter computer whether to provide supplemental underwriting data to the respective underwriter computer in addition to the respective transmitted underwriter specific standardized file;

l) if it is determined to provide supplemental underwriting data to the respective underwriter computer, entering supplemental underwriting data through the interface of the handheld mobile computing device to supplement the geocoded and time and date stamped record of underwriting data for the respective customer, associating a geocode and time and date stamp created by said global positioning device of the handheld mobile computing device with the entered supplemental underwriting data; uploading from said handheld mobile computing device the geocoded and time and date stamped supplemental underwriting data to the insurance portfolio data management system as part of the respective record of underwriting data; and providing from the insurance portfolio data management system the geocoded and time and date stamped supplemental underwriting data to the respective underwriter computer; and m) receiving electronically at least one quote on the handheld mobile computing device that is unique to an individual consumer risk profile for the respective customer.

* * * * *